(12) United States Patent
Wings et al.

(10) Patent No.: US 12,448,332 B2
(45) Date of Patent: Oct. 21, 2025

(54) COMPOSITION FOR A VERY DURABLE PASTY FILL AND FINISHING MATERIAL, PASTY FILL AND FINISHING MATERIAL, AND METHOD FOR PRODUCING IT

(71) Applicant: KNAUF GIPS KG, Iphofen (DE)

(72) Inventors: Norbert Wings, Wendelsheim (DE); Claudia Van Sloun, Korschenbroich (DE); Elena Heinrich, Neuss (DE); Sebastian Mischke, Meerbusch (DE)

(73) Assignee: KNAUF GIPS KG, Iphofen (DE)

( * ) Notice: Subject to any disclaimer, the term of this patent is extended or adjusted under 35 U.S.C. 154(b) by 727 days.

(21) Appl. No.: 17/289,896

(22) PCT Filed: Nov. 6, 2018

(86) PCT No.: PCT/EP2018/000500
§ 371 (c)(1),
(2) Date: Apr. 29, 2021

(87) PCT Pub. No.: WO2020/094206
PCT Pub. Date: May 14, 2020

(65) Prior Publication Data
US 2022/0002201 A1 Jan. 6, 2022

(51) Int. Cl.
| | | |
|---|---|---|
| *C04B 26/06* | (2006.01) | |
| *C04B 14/04* | (2006.01) | |
| *C04B 14/10* | (2006.01) | |
| *C04B 14/28* | (2006.01) | |
| *C04B 26/28* | (2006.01) | |
| *C04B 103/67* | (2006.01) | |

(52) U.S. Cl.
CPC ............ *C04B 26/06* (2013.01); *C04B 14/042* (2013.01); *C04B 14/104* (2013.01); *C04B 14/28* (2013.01); *C04B 26/285* (2013.01); *C04B 2103/67* (2013.01)

(58) Field of Classification Search
CPC ... C04B 14/042; C04B 14/102; C04B 14/104; C04B 14/106; C04B 14/20; C04B 14/26; C04B 14/28; C04B 14/365; C04B 2103/67; C04B 2111/00482; C04B 2111/00681; C04B 24/383; C04B 26/04; C04B 26/06; C04B 26/285
See application file for complete search history.

(56) References Cited

U.S. PATENT DOCUMENTS

| | | | | |
|---|---|---|---|---|
| 2008/0305252 A1* | 12/2008 | Cimaglio | ................ | C04B 26/04 524/427 |
| 2019/0002346 A1* | 1/2019 | Wings | .................. | C04B 24/026 |

FOREIGN PATENT DOCUMENTS

| | | |
|---|---|---|
| AU | 2014-246682 A1 | 7/2015 |
| CN | 1434082 A | 8/2003 |
| JP | S48-034940 A | 5/1973 |
| JP | S49-024157 A | 6/1974 |
| JP | H02-004876 A | 1/1990 |
| JP | H10-060368 A | 3/1998 |
| JP | 2003-510401 A2 | 3/2001 |
| WO | 2007-131618 A1 | 11/2007 |
| WO | WO-2017108145 A1 * | 6/2017 ........... C04B 14/042 |
| ZA | 2002-03124 B | 4/2003 |

OTHER PUBLICATIONS

International Search Report for co-pending European Patent Application No. PCT/EP2018/000500 dated Jul. 2, 2019.
Office Action from corresponding Japanese Patent Application No. 2021-24259 dated Nov. 29, 2022.

* cited by examiner

*Primary Examiner* — Shuangyi Abu Ali
(74) *Attorney, Agent, or Firm* — Christensen, Fonder, Dardi PLLC; Diane E. Bennett; Peter S. Dardi

(57) ABSTRACT

The invention relates to a composition for a pasty fill and finishing material, a pasty fill and finishing material, and a method for producing a pasty fill and finishing material. The composition comprises at least one filler, at least one binding agent, and additives, wherein the at least one binding agent comprises an organic polymer and hydroxyethyl cellulose, and wherein the at least one filler is a lamellar silicate material.

18 Claims, No Drawings

COMPOSITION FOR A VERY DURABLE PASTY FILL AND FINISHING MATERIAL, PASTY FILL AND FINISHING MATERIAL, AND METHOD FOR PRODUCING IT

CROSS REFERENCE TO RELATED APPLICATIONS

This application is a National Stage filing of PCT Application No. PCT/EP2018/000500 filed Nov. 6, 2018, entitled "Composition For A Very Durable Pasty Fill And Finishing Material, Pasty Fill And Finishing Material, And Method For Producing It", which is incorporated herein by reference.

The invention relates to a composition for a pasty fill and finishing material, a pasty fill and finishing material, and a method for producing a pasty fill and finishing material according to the respective independent claims.

In prior art, basically two types of filling materials are known for filling joints or for being applied to surfaces, such as walls, in order to smooth out unevenness and to additionally function as primer layer for another layer to be applied thereon. Namely, on the one hand, there are powdery filling materials, and on the other hand, there are pasty filling materials. Pasty filling materials have the advantage that they are ready to use whereas powdery filling materials have to be mixed with water before use. Pasty filling materials have to be storable over months without their processing characteristics being modified or deteriorated.

The pasty filling materials known in the state of the art (e.g. US 2005/0235878 A1) are physically drying systems comprising polymer binders, fillers and additives.

As polymer binder, for example, polyvinyl acetate, poly (ethylene-vinyl acetate) (EVA), polyacrylate, and/or polyvinyl alcohol (PVOH) is employed, either as aqueous dispersion or as re-dispersible powder. The binders have the function to bind the components of the filler material and to bond adhesively the filler to the substrate, like a wall or the like.

As filler components, nodular and lamellar materials are used which usually are of mineral origin. The filler components form the framework or skeleton of the coating and, thus, contribute to the layer thickness and sink characteristics depending on the amount of filler material added. Main mineral filler materials are (natural) calcium carbonate or calcium magnesium carbonate (dolomite).

As additives, e.g. thickening agents and biocides may be used. Thickening agents may be cellulose-based additives, as hydroxypropyl methyl cellulose and hydroxyethyl cellulose which have the effect that the viscosity of the filling material is maintained constant, and which ensure a constant processability when stored over a time period of up to one year.

Biocides are added in order to prevent bacterial contamination, and finally, fungicides are added for preventing fungal infection.

Pasty filling materials are meanwhile more and more used for semi-finishing surfaces, thus thereinafter named as pasty fill and finishing materials. Semi-finishing means in this context, that no further coating on the surface is required. However, subsequent coatings (e.g. decorative coatings) are possible. The majority of pasty fill and finishing materials is applied manually, for example, by means of a trowel. If needed, the person using this fill and finishing material adds water for facilitating and improving the processability.

With increasing mechanization the application of chemical building products, pasty fill and finishing materials that can be used in processing machines have been developed. Specifically, sprayable fill and finishing materials have been developed which can be applied to a surface with a layer thickness of up to 3 mm and which act as a substrate for further, subsequently applied layers as for example wall paint or wall papers.

However, sprayable fill and finishing materials on a mineral basis known from prior art have the following shortcomings: When applying the pasty fill and finishing material by spraying, usually the method of hydraulic atomization or "airless application method" is employed. A key requirement for the airless application is that the homogeneous pasty fill and finishing material requires a reduced shear stress once it is being moved through the spraying equipment and the spray nozzle during spraying. Therefore, pasty sprayable fill and finishing materials have to be thoroughly prepared by mechanical homogenization prior to being applied to a surface or joint, which effects a shear thinning This additional procedure leads to a substantial increase of the total processing time.

Further, in pasty sprayable fill and finishing materials known from prior art as well as in plaster materials usually organic components are implemented in order to ensure their mechanical workability. The use of organic components, however, usually involves emissions and odor nuisance, which restricts the use of such products with respect to indoor application. Moreover, organic components are critical with respect to fire protection.

Pasty sprayable fill and finishing materials are used to level unevenness of a surface to provide a homogeneous surface for further coatings, for example, decorative coatings. In cases where these pasty fill and finishing materials are used as substrate layers for subsequent decorative coatings, products having a very high brightness and a high drying capacity may be employed.

Finally, in fields of application with high mechanical stress through scratching or bouncing events, the conventional pasty fill and finishing materials are not applicable, because they are too brittle and/or too soft.

Therefore, it is a key objective of the present invention, to provide a composition for a pasty fill and finishing material, which can be easily processed by machines, provide good crack and shrinkage resistance, and shows high resistance to scratches and bouncing events. It is also an objective of the present invention to provide a corresponding pasty fill and finishing material, and a method for producing such a pasty fill and finishing material.

This objective is solved by a composition for a pasty fill and finishing material comprising at least one filler, at least one binding agent, and additives, wherein the at least one binding agent comprises an organic polymer and hydroxyl ethyl cellulose, and wherein the at least one filler is a lamellar silicate material. Preferred embodiments of the invention are defined in the respective dependent claims.

The inventive composition provides pasty fill and finishing materials, which can be used without any additional processing or preceding preparation steps, in particular in airless spraying applications. Such pasty fill and finishing materials can be easy manually processed and provide good crack and shrinkage resistance. Further, these pasty fill and finishing materials provide an improved resistance to scratches and bouncing events.

The lamellar structure of the lamellar silicate material favors the sliding of the mineral particles within the product matrix at a high shear rate.

Another advantage is if sepiolite is used in such pasty fill and finishing materials as lamellar silicate material that contamination with asbestos and other filamentary components can be ruled out. Moreover, if sepiolite is used in such pasty fill and finishing materials as lamellar silicate material, much smaller amounts of the lamellar silicate material are needed, which is interesting for economic reasons.

Using hydroxyl ethyl cellulose (HEC) as protective colloid to stabilize the binding agent leads surprisingly to a higher binding affinity of the inorganic materials than a stabilization with polyvinyl alcohol (PVOH).

Finally, the composition according to the invention stays rather simple with its ingredients. This means e.g. no further aliphatic or cyclic liquid hydrocarbons, modified fatty acids, nonionic emulsifiers or silicone oil are needed to improve the flow characteristics of the sprayable filler material.

According to a preferred embodiment of the invention the organic polymer can be selected from a group consisting of poly(ethylene-vinyl acetate), polyvinyl acetate, polyacrylate, or any combinations thereof, preferably poly(ethylene-vinyl acetate).

The composition can comprise 0.1 to 20% by weight of the total composition, preferably 3 to 15% by weight of the total composition, more preferably 5 to 8% by weight of the total composition of the at least one binding agent.

Moreover, the at least one binding agent can comprise 0.001 to 0.20% by weight of the total composition, preferably 0.001 to 0.10% by weight of the total composition, more preferably 0.0015 to 0.09% by weight of the total composition of the hydroxyethyl cellulose.

Commercially available are binding agents, which are stabilized with hydroxyl ethyl cellulose (HEC), e.g. from Celanese Emulsions GmbH as, e.g., Molwilith LDM 1880. In this product the solids content is about 55% by weight.

Moreover, if poly(ethylene-vinyl acetate) stabilized with hydroxyl ethyl cellulose (HEC) and sepiolite are used both in the composition according to the invention, a good sprayability of the pasty fill and finishing material can be achieved.

Further, the lamellar silicate material can be selected from a group consisting of sepiolite, attapulgite, talc, montmorillonite, illite, kaolinite or hectorite, preferably attapulgite or sepiolite, more preferably sepiolite. The lamellar siliceous materials preferably depict a platelet shape.

Sepiolite has multiple advantages. Not only that a contamination with fibres, which are critical according to WHO criteris (e.g. asbestos) is avoided, it is also possible to use sepiolite in a much smaller amount than e.g. attapulgite.

Therefore, the composition may comprise 0.01 to 1.00% by weight of the total composition, preferably 0.03 to 0.50% by weight of the total composition, more preferably 0.05 to 0.20% by weight of the total composition of the lamellar silicate material. Especially preferred is an amount of 0.05 to 0.20% by weight of the total composition of sepiolite.

The structure of lamellar silicate materials which are useful in the inventive composition are formed by central atoms in their structure as structuring elements. They can comprise magnesium and/or aluminium. Sepiolite has magnesium while attapulgite has aluminum as structuring element.

Further, the composition may comprise cellulose as thickening agent. Here, the composition may comprise preferably modified cellulose, more preferably 2-hydroxyethyl methyl cellulose, hydroxypropyl cellulose, ethylcellulose, methylcellulose, methyl ethyl cellulose, carboxymethyl cellulose, hydroxyethyl cellulose (HEC), hydroxypropyl methyl cellulose (HPMC), or any combinations thereof, most preferably hydroxyethyl cellulose, hydroxypropyl methyl cellulose, or any combinations thereof.

Moreover, the composition may comprise 0.1 to 2.0% by weight of the total composition of cellulose, preferably 0.1 to 1.0% by weight of the total composition of cellulose. In a very preferred embodiment of the invention 0.01 to 0.2% by weight of the total composition of hydroxypropyl methyl cellulose and 0.35 to 0.6% by weight of the total composition of hydroxyethyl cellulose may be comprised in the inventive composition.

It has to mentioned that the HEC used as a thickening agent—if it is used—has a different function than the HEC which is used as a stabilizer in the binding agent, as described above.

According to a preferred embodiment of the invention, the composition may comprise at least two fillers, wherein the first filler is a lamellar silicate material and the second further filler is selected from the group consisting of calcium sulfate dihydrate, calcium carbonate, calcium magnesium carbonate and any combination thereof, preferably calcium carbonate, calcium magnesium carbonate and any combination thereof, more preferably calcium magnesium carbonate.

Preferably, the composition comprises 60 to 65% by weight of the total composition of this second filler.

According to another preferred embodiment of the invention, the composition may comprise at least a third filler, wherein the third filler is a mica mineral, preferably muscovite.

According to yet another further preferred embodiment of the invention, the composition further may comprise biocides as additives.

The biocides may be added to the composition on a basis of 2-methyl-1,2H-thiazol-3(2H)-one (MIT), 1,2-benzoisothiazol-3(2H)-one (BIT) and/or 2-bromo-2-nitropopane-1,3-diol (BNPD).

It is also preferable, if the composition comprises 0.1 to 1% by weight of the total composition, preferably 0.1 to 0.4% by weight of the total composition of biocides.

According to the present invention, also a pasty fill and finishing material, in particular a physically drying sprayable fill and finishing material, which is made from the above specified composition is provided. The inventive pasty fill and finishing material provides the advantages already described above in connection with its composition.

Preferably, the specific weight of the pasty fill and finishing material is between 1.0 kg/l and 1.9 kg/l. In particular preferred it is between 1.2 kg/l and 1.7 kg/l.

The present invention also provides a method for producing a pasty fill and finishing material, in particular also a pasty fill and finishing material as specified above. The method is based on a two-stage process, according to which in a first step, dry components are homogenized, and in a second step, the homogenized dry components are added to aqueous or water-dilutable components.

The dry components can comprise fillers, lamellar silicate materials, celluloses, and optionally other dry additives and/or dry binding agents.

The aqueous or water-dilutable components can comprise binding agents, and optionally other liquid additives. By the inventive method, a pasty fill and finishing material having the above described advantages can be provided.

Preferably, the first and second steps of the two-stage process may be carried out in parallel for more than 80% of the processing time. Thus, the parallel processing saves processing time, and thus renders the method more economical.

The resulting pasty fill and finishing material generally can be applied by all methods known from the state of the art, e.g. by aid of mechanic tools or by machine processing. The machine processing is preferred.

Further details and features of the invention are shown in the following examples, which are just for clarification and do not restrict by any means the scope of protection conferred by the claims.

Table 1 shows a comparison of state of the art samples comprising palygorskite (attapulgite) and EVA which is not stabilized with HEC (but with PVOH) and an embodiment of the invention comprising sepiolite (instead of palygorskite in the state of the art sample) and EVA stabilized with HEC. However, none of the two comparison examples shows high resistance to scratches and bouncing events.

It has to be mentioned that for having a similar sagging (or slipping down) behavior of the pasty fill and finishing material with attapulgite instead of sepiolite, much more attapulgite (for example 1.9% by weight) is necessary. Surprisingly, this was not the case if Sepiolite was used. With Sepiolite only less (or equal) than 0.20% by weight were needed to arrive to a similar sagging (or slipping down) behavior of the pasty fill and finishing material. The sagging behavior is tested by homogenizing a sample and transferring it without bubbles into a syringe. Then the sample is applied evenly on a specific spot on gypsum plasterboard.

TABLE 1

| Raw material | Chemical description of raw material | Comparison Example (regular weight) % by weight | Comparison Example (light weight) % by weight | Example according to the invention % by weight |
| --- | --- | --- | --- | --- |
| Dolomite powder 90 µm | carbonate | 60-65 | 40-50 | 60-65 |
| Minugel FG | palygorskite (attapulgite) | 1-2 | 1-3 | 0 |
| MicaCelia 125 | muscovite mica | 0 | 0 | 0.5-2.0 |
| Volite 200 H (SMK) | micronised expanded perlite | 0 | 2-5 | 0 |
| Pangel S9 | sepiolite | 0 | 0 | 0.05-0.2 |
| Cellosize QP 52000 | hydroxyethyl cellulose (HEC) | 0.35-0.6 | 0.35-0.6 | 0.35-0.6 |
| Walocel MK 25000 PFV | hydroxypropyl methyl cellulose (HPMC) | 0.01-0.4 | 0.01-0.4 | 0.01-0.4 |
| Selvol E205 S | polyvinylalcohole (PVOH) | 0.1-0.5 | 0 | 0 |
| Agitan 351 | blend of alkoxylated nonionic compounds, nonionic fatty compounds and hydrophobic silica | 0 | 0.1-0.2 | 0 |
| Vinamul 3171 | poly(ethylene-vinyl acetate) (EVA) dispersion stabilized with PVOH | 1.0-5.0 | 1.0-5.0 | 0 |
| Mowilith LDM 1880 | poly(ethylene-vinyl acetate) (EVA) dispersion stabilized with HEC | 0 | 0 | 5-8 |
| Biocides | 2-methyl-1,2H-thiazol-3(2H)-one (MIT) and 1,2-benzoisothiazol-3(2H)-one (BIT) | 0.1-0.4 | 0.1-0.4 | 0.1-0.4 |
| Water | water | 25-30 | 30-50 | 25-30 |
| Total batch | | 100 | 100 | 100 |

In table 2, in which the same raw materials as the in inventive example of table 1 (except for the materials mentioned in table 2) are used, the influence of the combination of sepiolite with HEC stabilized EVA on the hardness of the surface and the sprayability is shown compared to attapulgite and/or PVOH stabilized EVA (Mowilith LDM 1871 PVOH).

Then the gypsum plasterboard is positioned in an upright position at room temperature for 24 hours.

Afterwards the distance from the lowest point of the sample to the starting point is measured. For example, the inventive composition and the comparison example (regular weight) both have in this test a comparable sagging behavior of around 150 mm, although there is a factor of 8 difference in the amount of the lamellar silicate material.

TABLE 2

| | Content EVA (wt %, solid content in polymer dispersion) | Content attapulgite (% by weight) | Content sepiolite (% by weight) | Taber abraser result (weight loss in g) | Sprayability |
| --- | --- | --- | --- | --- | --- |
| Combination of EVA (PVOH stabilized) with attapulgite | 1.2 | 1.9 | — | 2.08 | not sprayable |
| Combination of EVA (PVOH stabilized) with sepiolite | 1.25 | — | 0.15 | 1.21 | not sprayable |
| Combination of EVA (PVOH stabilized) with attapulgite | 3.8 | 1.9 | — | 1.13 | not sprayable |
| Combination of EVA (PVOH stabilized) with sepiolite | 3.8 | — | 0.15 | 1.12 | not sprayable |
| Combination of EVA (HEC stabilized) with | 3.8 | 1.9 | — | 0.83 | not sprayable |

TABLE 2-continued

| | Content EVA (wt %, solid content in polymer dispersion) | Content attapulgite (% by weight) | Content sepiolite (% by weight) | Taber abraser result (weight loss in g) | Sprayability |
|---|---|---|---|---|---|
| attapulgite | | | | | |
| Combination of EVA (HEC stabilized) with sepiolite | 3.8 | — | 0.15 | 0.70 | good sprayable |

Abrasion is tested by bringing up the pasty fill and finishing material as prepared according to the composition described above with a thickness of about 2 mm on a defined piece of a gypsum plasterboard. After drying at room temperature until constant weight (usually 3 days) the prepared sample is weighed and placed into an abrasion testing-machine (Taber-Abraser Modell 503) and is rotated 100 times with 60 rotations per minute and sandpaper S 33 and 500 g of check weight. After that, the weight of the prepared sample is checked again and the difference is the abrasion. According to abrasion, the smaller the value (in g) the higher the scratch resistance. This means that the surface of the composition is harder to destroy.

A pasty sprayable fill and finishing material having a composition according to an embodiment of the present invention provides for a homogeneous substance, which still has comparably low shear stress, and higher shear rates. The pasty sprayable fill and finishing material having a composition according to an embodiment of the present invention further provides at a layer thickness of 1 to 3 mm a homogeneous surface for optionally following decorative coatings and shows high resistance to scratches and bouncing events. The surface is so smooth that sanding is usually not required.

Further, a pasty sprayable fill and finishing material having a composition according to an embodiment of the present invention, including sepiolite in combination with a HEC stabilized organic polymer, preferably poly(ethylene-vinyl acetate) (EVA), leads to a mechanical strengthening of the coating during the film formation. Moreover, this combination strengthens the hardness of the film without making the surface brittle or fragile. On a stable substrate, the respective surface shows a significant increase of the scratch resistance and the abrasion resistance by a factor of 10 (profile depth difference in the prior art: 470 µm; profile depth difference in example of table 1: 40 µm).

The invention claimed is:

1. A composition for a pasty fill and finishing material, comprising
    at least one filler, at least one binding agent, water, and additives, wherein the at least one binding agent comprises an organic polymer stabilized with hydroxyethyl cellulose, and wherein the at least one filler comprises a first filler and a second filler, wherein the first filler is sepiolite, wherein the composition comprises sepiolite in an amount from 0.05 to 0.20% by weight of the composition, wherein the composition comprises the second filler in an amount from 60 to 65% by weight of the composition, and wherein the composition comprises the water in an amount from 25 to 30% by weight of the composition.

2. The composition according to claim 1, wherein the organic polymer is selected from a group consisting of poly(ethylene-vinyl acetate), polyvinyl acetate, polyacrylate, or any combinations thereof.

3. The composition according to claim 1, wherein the composition comprises the at least one binding agent in an amount of 0.1 to 20% by weight of the composition.

4. The composition according to claim 1, wherein the at least one binding agent comprises the hydroxyethyl cellulose in an amount of 0.001 to 0.20% by weight of the composition.

5. The composition according to claim 1, wherein the additives comprise cellulose, modified cellulose, or a combination thereof.

6. The composition according to claim 5, wherein the composition comprises the cellulose in an amount of 0.1 to 2.0% by weight of the composition.

7. The composition according to claim 5, wherein the additives comprise hydroxypropyl methyl cellulose in an amount of 0.01 to 0.4% by weight of the composition and hydroxyethyl cellulose in an amount of 0.35 to 0.6% by weight of the composition.

8. The composition according to claim 1, wherein the second filler is selected from the group consisting of calcium sulfate dihydrate, calcium carbonate, calcium magnesium carbonate and any combination thereof.

9. The composition according to claim 8, wherein the composition comprises at least a third filler in an amount from 0.5 to 2.0% by weight of the composition, wherein the third filler is a mica mineral.

10. The composition according to claim 1, wherein the additives comprise biocides in an amount from 0.1 to 0.4% by weight of the composition.

11. The composition according to claim 1, wherein the organic polymer comprises poly(ethylene-vinyl acetate).

12. The composition according to claim 1, wherein the composition comprises the at least one binding agent in an amount of 3 to 15% by weight of the composition.

13. The composition according to claim 1, wherein the additives comprise 2-hydroxyethyl methyl cellulose, hydroxypropyl cellulose, ethylcellulose, methylcellulose, methyl ethyl cellulose, carboxymethyl cellulose, hydroxyethyl cellulose, hydroxypropyl methyl cellulose, or any combinations thereof.

14. The composition according to claim 1, wherein the composition comprises the organic polymer stabilized with hydroxyethyl cellulose in an amount of 5.0 to 8.0% by weight of the composition.

15. The composition according to claim 1, wherein the at least one binding agent comprises the hydroxyethyl cellulose in an amount of 0.0015 to 0.09% by weight of the composition.

16. The composition according to claim 9, wherein the third filler is muscovite.

17. The composition according to claim 1, wherein the second filler is calcium magnesium carbonate.

18. The composition according to claim 1, wherein the second filler is calcium magnesium carbonate, wherein the organic polymer stabilized with hydroxyethyl cellulose is a poly(ethylene-vinyl acetate) dispersion stabilized with hydroxyethyl cellulose, wherein the composition comprises the organic polymer stabilized with hydroxyethyl cellulose in an amount from 5 to 8% by weight of the composition, wherein the additives are hydroxypropyl methyl cellulose in an amount of 0.01 to 0.4% by weight of the composition, hydroxyethyl cellulose in an amount of 0.35 to 0.6% by weight of the composition, and biocides in an amount of 0.1 to 0.4% by weight of the composition, and wherein the composition further comprises a third filler, wherein the third filler is muscovite mica, and wherein the composition comprises the third filler in an amount from 0.5 to 2.0% by weight of the composition.

\* \* \* \* \*